Jan. 22, 1957 J. P. FRANCIS 2,778,676
WINDSHIELD VISOR AND SUPPORTING MEANS THEREFOR
Filed June 29, 1954
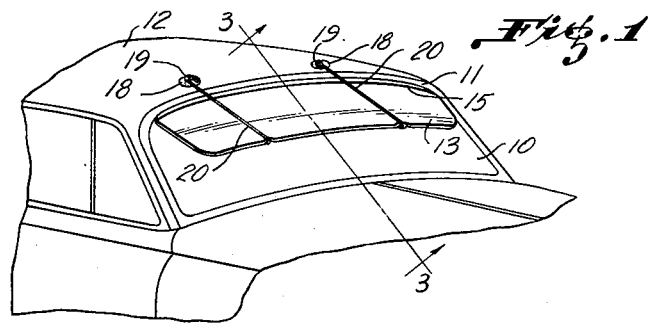
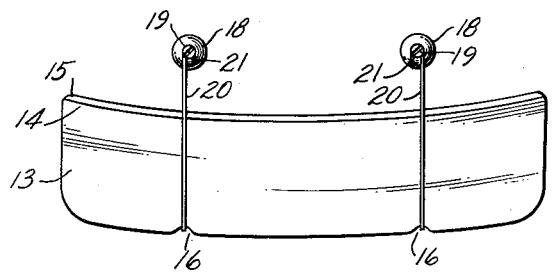
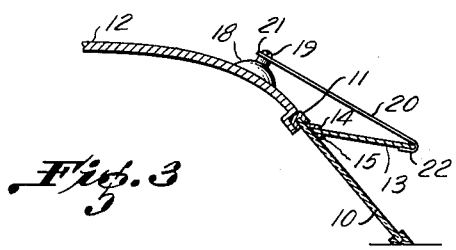
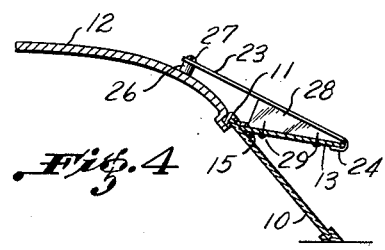
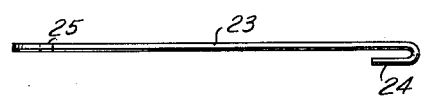
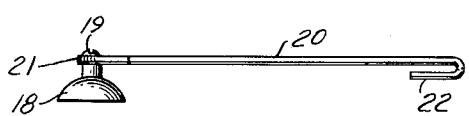
INVENTOR
John P. Francis
BY
ATTORNEY

United States Patent Office 2,778,676
Patented Jan. 22, 1957

2,778,676

WINDSHIELD VISOR AND SUPPORTING MEANS THEREFOR

John P. Francis, Haverhill, Mass.

Application June 29, 1954, Serial No. 439,953

4 Claims. (Cl. 296—95)

This invention relates to improvements in windshield visors and the supporting means therefor, and has for an object to provide a simple and improved visor construction adapted to engage the top of the windshield area of a motor vehicle, in either fluid sealing engagement or friction supporting engagement therewith, or a combination of both, or in disengagement from the windshield in spaced relation thereto.

Another object is to provide a supporting means for the visor which is easily and quickly attached to the roof and also to the visor, and removable in a like manner without any defacing of the appearance of the motor vehicle.

A still further object is to provide substantial protection to the windshield from sleet, snow, rain, and the formation of ice thereon, and to create an aid to visibility when viewing outdoor movies at drive-in theatres and other outdoor events, thereby eliminating the continuous or the repeated on and off use of the motor or auxiliary means to operate the windshield wipers.

With these and still other objects in view, as will hereinafter more fully appear, the invention comprises certain novel constructions, combination and arrangement of parts, hereinafter described and claimed, and illustrated in the accompanying drawings, in which:

Figure 1 is a perspective view, in fragment, of the front part of a motor vehicle, the view including a perspective view of my visor in fluid sealing engagement with the windshield and my supporting means therefor.

Figure 2 is a top plan view of the visor showing the resilient member on the rear lateral portion of the visor and the supporting means therefor.

Figure 3 is a cross-sectional view taken substantially on line 3—3 of Figure 1.

Figure 4 is also a cross-sectional view, in a modified form, showing the plug member fastened to the roof and also the bracket for rigid support of the visor.

Figure 5 is a side elevation view of the supporting means with a curved end formed on the support engaging the vacuum cup; and Figure 6 is also a side elevation view of a support provided with a longitudinal slot at one end thereof.

Referring now more specifically to the drawings, attention is directed to Figure 1, wherein numeral 13 generally indicates the visor which is shown supported over and from the windshield 10, with the rear lateral portion 14 of the visor 13 formed substantially in contour with the said windshield and having a resilient member 15, such as rubber or the like, attached to the rear portion 14 for fluid sealing engagement with the said windshield. The visor panel 13 may be constructed of any suitable flexible, rigid or semi-rigid material such as sheet metal, Masonite, fibre board, or other composition.

The visor 13, as shown in Figures 1 and 2, has the shape and contour at the rear lateral portion 14 to conform substantially with the transverse and the forward to rearward curvature of the top of the windshield area below the moulding 11, for example the present wrap around type of windshield, and is provided with a resilient member 15 adapted to engage the windshield area as a fluid sealing member or as a friction engaging and supporting member. The visor 13 may be of a lateral width to span substantially the entire windshield, or any part thereof, such as a pair of sectional visors adjoining at the center and supported by additional supporting means, or a specific lateral width for a specific location on the windshield depending upon the type of windshield.

The visor 13 is also adapted to be supported in fluid sealing engagement, without the resilient member 15, since the rear lateral portion 14 of the visor engages the lateral windshield area below the outward projection of the moulding 11 in supporting engagement therewith.

The supporting means for supporting the visor 13, in one embodiment, has vacuum cups 18 provided with threaded bolts 19 adapted to engage the curved end 21 of the supports 20, or the longitudinal slot 25 of the support 23. The supports, 20 and 23, have curved ends, 22 and 24 respectively, to engage the visor 13 within the notches 16 or apertures which may be formed in the visor. In this embodiment, with vacuum cups 18, the supporting means are used primarily when the vehicle is parked or while viewing outdoor events under a hot or glaring sun or in the event of rain, sleet or snow descending upon the windshield.

To mount the visor and supporting means, as shown in Figures 1, 2 and 3, first the vacuum cups 18 are attached to the roof 12 in a well known manner, with the supports 20 or supports 23 in Figure 6 attached to the cups 18. To complete the installation, the visor 13 is then attached to the curved ends of the supports, wherein resilient member 15 upon adjusting the vacuum cups 18 for proper location engages the windshield in friction supporting engagement, thereby supporting the rear lateral portion of the visor. In dismantling, the visor is removed without the aid of any tools and the supporting means may be left on the roof for future use, or removed in part or in whole and may be stored with the visor in the trunk of the motor vehicle.

In Figure 4 is shown another embodiment of my supporting means, which may be used in part with the embodiment previously outlined. This embodiment includes a plug member 26 secured to the roof 12 by spot-welding thereto or by other means such as a bolt (not shown) applied from the underside of the roof. Also included in this embodiment is the triangular-shaped plate bracket 28 which may be welded or secured to the supports 23 by fastening means such as bolts or screws (not shown). The supports 23 may also be constructed as a rigid supporting unit by stamping or bending to shape the said supports by eliminating the bracket 28, Figure 4, and forming the bracket by shaping the supports, as required. With the visor 13 secured to the base of the triangular-shaped plate brackets 28 by screw fastenings 29 or other suitable means, the visor is sufficiently rigid to withstand all driving and weather conditions.

To mount the embodiment of Figure 4, the support 23 is secured to the plug member 26 by a threaded bolt 27 engaging the longitudinal slot 25. The visor 13 is then attached to the bracket 28 by fastenings 29 and also to the curved end 24 of the support. It is to be understood that the curved end 24 may be eliminated when the support is bent to shape to form the bracket support in a single unit. The provision of the longitudinal slot 25 in the support 23 enables the visor 13 to be supported in fluid sealing engagement, or by a forward movement of the support 23, to be disengaged from the windshield in spaced relation thereto. It is therefore to be understood that changes may be made in this embodiment alone or combined one embodiment with the other.

Having described my supports 20 and 23 for supporting a windshield visor from the surface of a windshield, in engagement and disengagement therewith, I desire to add that the said supports may be constructed of any suitable form of material such as a rod member, flat bar or rectangular shaped member.

From the foregoing description taken in connection with the accompanying drawings, it will be manifest that a supporting means for supporting a windshield visor from the windshield area of a motor vehicle in either fluid sealing engagement, or friction supporting engagement therewith, or a combination of both, is provided that will fulfill all the necessary requirements of such a device, but as changes could be made in the aforesaid description and apparently different embodiments of the invention may be constructed within the scope of the appended claims, without departing from the spirit or scope thereof, it is intended that all matters contained in the said accompanying specification and drawings shall be interpreted as illustrative and not in a limitative or restricted sense. Changes, therefore, in the construction and arrangement may be made without departing from the spirit and scope of the invention as disclosed in the appended claims.

I claim:

1. A rain visor for the windshield of a motor vehicle comprising a visor having each side longitudinal flat portion thereof extending farther rearwardly than the central rear edge portion with the rear lateral edge of said visor being additionally adapted in contour to engage against the lateral and downward contour of the uppermost windshield area adjacent to the molding projection of said windshield in frictionally supporting the rear lateral portion of the visor thereto, visor supports supported above the roof top of said vehicle in spaced relation thereto, roof engaging means mounted on said roof top for supporting said supports, each of said supports extending in one piece from and above said roof engaging means and overlying the upper surface of the visor inwardly of the side edges thereof with a triangular-shaped plate bracket member secured to the under surface of the support to form a rigid vertical support, a base of said bracket member of each support secured to the upper surface of the visor in supporting said visor, whereby the rear lateral edge and the upper rear lateral portion of said visor is freely engaged against the uppermost lateral windshield area and the molding projection respectively in friction supporting and rain sealing engagement therewith.

2. A rain visor for the windshield of a motor vehicle comprising a visor having each side longitudinal flat portion thereof extending farther rearwardly than the central rear edge portion with the rear lateral edge of said visor being additionally adapted in contour to engage against the lateral and downward contour of the uppermost windshield area adjacent to the molding projection of said windshield in frictionally supporting the rear lateral portion of the visor thereto, visor supports supported above the roof top of said vehicle in spaced relation thereto, roof engaging means mounted on said roof top for supporting said supports, said supports being adjustably supported for forward or rearward movement and extending in one piece from and above said roof engaging means and overlying the upper surface of the visor inwardly of the side edges thereof with a triangular-shaped plate bracket member secured to the under surface of the support to form a rigid vertical support, a base of said bracket member of each support secured to the upper surface of said visor in supporting said visor for forward or rearward movement, whereby the rear lateral edge and the upper rear lateral portion of said visor is freely engaged in friction supporting and rain sealing engagement against the uppermost lateral windshield area and the molding projection respectively when in the rearmost position of longitudinal adjustment and in spaced relation to the said windshield area when the visor is in the forward position of longitudinal adjustment.

3. A rain visor for the windshield of a motor vehicle comprising a flat one piece longitudinally rigid and laterally flexible visor panel having each of the extreme side longitudinal flat portions thereof extending farther rearwardly than the central rear lateral edge with the rear lateral edge of said one piece visor panel being additionally contoured laterally and when attached to the windshield to flexibly engage against the lateral and the downward contour of the uppermost lateral windshield area and the molding projection thereof in freely supporting the rear lateral edge of the said one piece visor panel in both rain sealing engagement and friction supporting abutment therewith independently of the attachable support for supporting the said one piece visor panel, a visor support supported in spaced relation above the roof top of said vehicle, and roof engaging means mounted on said roof top for clampingly engaging and supporting said support therefrom, said support extending from and above the said roof engaging means and inwardly of the side edges of the visor panel in engaging and supporting the outer portion of said visor panel as the sole means of attachable support for supporting the said visor panel.

4. A rain visor for the windshield of a motor vehicle comprising a flat one piece longitudinally rigid and laterally flexible visor panel having each of the extreme side longitudinal flat portions thereof extending farther rearwardly than the central rear lateral edge with the rear lateral edge of said one piece visor panel being additionally contoured laterally and when attached to the windshield to flexibly engage against the lateral and the downward contour of the uppermost lateral windshield area and the molding projection thereof in freely supporting the rear lateral edge of the said one piece visor panel in both rain sealing engagement and friction supporting abutment therewith independently of the attachable support for supporting the said one piece visor panel, a visor support supported in spaced relation above the roof top of said vehicle, and roof engaging means mounted on said roof top for clampingly engaging the laterally curved extension of said support for supporting said support therefrom, said support extending from and above the said roof engaging means and inwardly of the side edges of the visor panel with the outer end of said support extending at a downward angle from the said support and rearwardly thereof in engaging and supporting the outer portion of said visor panel as the sole means of attachable support for supporting the said visor panel.

References Cited in the file of this patent

UNITED STATES PATENTS

| | | |
|---|---|---|
| 1,011,940 | Gilson | Dec. 19, 1911 |
| 1,260,577 | Pritchard | Mar. 26, 1918 |
| 1,309,352 | Christopher | July 8, 1919 |
| 2,121,264 | Rubottom | June 21, 1938 |
| 2,511,401 | Ellithrope | June 13, 1950 |
| 2,686,077 | Upton | Aug. 10, 1954 |
| 2,707,128 | Greenfield | Apr. 26, 1955 |
| 2,720,415 | Helvey et al. | Oct. 11, 1955 |

FOREIGN PATENTS

| | | |
|---|---|---|
| 20,448 | Great Britain | of 1913 |